3,442,676
METHOD OF PREPARING A STABLE WAX DISPERSION USING β-1,4 GLUCAN

Alan M. Belfort, Devon, Pa., assignor to FMC Corporation, Philadelphia, Pa., a corporation of Delaware
No Drawing. Filed Dec. 29, 1965, Ser. No. 517,476
Int. Cl. C08h *9/06, 9/08, 9/00*
U.S. Cl. 106—271       10 Claims

ABSTRACT OF THE DISCLOSURE

A method of preparing a stable oil-in-water type wax dispersion wherein a normally solid wax in a fluid state is mixed together with an aqueous dispersion of finely-divided, water-insoluble particles comprising β-1,4 glucan or its derivatives, at least about 1% of the particles having a size no greater than about one micron and a length to diameter ratio greater than one, and solidifying said wax material to obtain a stable dispersion: and stable wax dispersions of the type prepared by said method, are disclosed herein.

---

Aqueous dispersions of waxes or waxy materials are difficult to prepare, and preparation usually requires artful techniques and tedious procedures. These oil-in-water (O/W) dispersions must contain a high proportion of surface active agent and/or emulsifier, which components reduce the desirable physical properties of the incorporated wax.

Commercially available wax dispersions are generally not stable at low temperatures or under strong acid or basic conditions unless additional additives are incorporated for this purpose.

It is a primary object of this invention to provide a method of preparing aqueous wax dispersions which does not partially destroy the usefulness of the wax component.

It is another object of this invention to provide a method wherein wax is easily and readily dispersed in an aqueous medium.

It is still another object of this invention to provide a method of preparing aqeous wax dispersions which dispersions have unexpectedly imporved stability at low temperatures and under extreme acid or basic conditions without added stabilizer components.

These and other objects are accomplished in accordance with this invention wherein a method of preparing an aqueous wax dispersion of the oil-in-water type comprises mixing together (1) An aqueous dispersion of finely-divided water-insoluble organic particles, a major proportion consisting of β-1,4 glucan or derivatives thereof, at least about 1% by weight of said particles having a size of no greater than about 1 micron and having a length to diameter ratio greater than 1 and preferably at least 2:1 up to about 15:1 and (2) A normally solid wax material in a fluid state, and then solidifying said wax material, said wax dispersion containing from about 0.5 to about 5 wt. percent of said water-insoluble organic particles and from about 10 to about 60 wt. percent of said wax material.

In a preferred embodiment of this invention, the aqueous wax dispersion is prepared by mixing an aqueous dispersion of from about 1 to 3 wt. percent of water-insoluble organic particles, a major portion consisting of β-1,4 glucan, at least about 30% and more preferably at least about 80% by weight of said particles having a size no greater than about 0.4 micron and having a length to diameter ratio of from 2:1 to 15:1, and from about 15% to about 40% based on the weight of the dispersion of a normally solid wax material in a fluid state.

For the purposes of this invention, the term "a normally solid wax material in a fluid state" encompasses a molten wax material and a wax material dissolved in an organic solvent which is capable of being removed from an aqueous system by heating to less than 100° C. for example, aromatic organic solvents such as benzene, toluene or xylene are suitable for this purpose.

The aqueous dispersions described above may be prepared in any convenient manner, for example, the aqueous dispersion of β-1,4 glucan-containing material is heated to 80–100° C., agitated with a mechanical mixing device, and molten wax added to the aqueous dispersion. An emulsion of small globules of molten wax in a continuous aqueous medium is formed by the shearing force of the mixer. The mixture is permitted to cool, either with agitation or quiescently, so that at the melting point of the wax, the liquid spheres present in the dispersion solidify to form a stable emulsion containing wax particles generally below 5–10 microns in diameter.

The O/W emulsion may also be formed by an inversion technique wherein a heated aqueous dispersion of B-1,4 glucan-containing material is slowly added with agitation to the molten wax material. The mixture gradually thickens to the inversion point where the emulsion type changes rapidly from water-in-oil to oil-in-water, and the mixture becomes fluid. The dispersion or emulsion is allowed to cool to produce a stable product.

If the wax material is a high boiling substance, such as found in certain synthetic waxes, it may be dissolved in an organic solvent and the solution mixed with the aqueous dispersion of β-1,4 glucan material. After thorough mixing, the dispersion is heated to vaporize the organic solvent. The solvent vapors are removed and the dispersion permitted to cool while agitated. A stable wax dispersion is formed .

The water-insoluble, organic material of which a major proportion is β-1,4 glucan, is originally derived from cellulose-containing plant life, in most instances, wood, cotton, and bast or leaf fibers. In general, materials obtained from a holo-cellulose source are most useful, for example, ramie, flax, hemp, cotton, processed cellulose-containing material, for example, cotton linters, purified cotton, wood pulps such as bleached sulfite and sulfite pulps, regenerated forms of cellulose including rayon and cellophane, and the like. If the source material is too low in β-1,4 glucan content, it is purified to remove nonessential or undesirable components such as pentosans, galactomannans, glucomannans, and the like, to provide a product containing at least a major proportion and preferably from 90 to about 99% of β-1,4 glucan.

This material is then finely devided to provide particles at least about 1% by weight of which are less than 1 micron, Stokes equivalent diameter, and have a length to diameter ratio greater than 1, preferably at least 2:1 up to about 15:1 as determined, for example, by examination with an electron microscope, a substantial proportion of the remaining particles being not greater than 50 microns, Stokes equivalent diameter. Preferably, diminution of the particles is continued to provide particles at least about 30% by weight having a size no greater than about 0.4 micron, and a length to diameter ratio of from 2:1 to 15:1, a substantial proportion of the remaining particles being not greater than 11 microns. More preferably, the water-insoluble organic material is manufactured into particles at least about 80% by weight of which have a size no greater than about 0.4 micron and a length to diameter ratio of about 2:1 to 15:1.

The term "substantial" as used above is meant to include a mass of particles at least about 90% of the total of which are within the prescribed particle range.

Actual particle size determinations, as made herein, are measured in microns, Stokes equivalent diameter.

The methods of achieving the low particle size and length to width ratio are not critical from the standpoint of this invention and will generally include, for example, mechanical disintegration, a combination of chemical degradation and mechanical attrition, chemical treatment only, precipitation from solution, and chemical regeneration. It is preferred on the basis of practical utility, that a combination of chemical degradation and mechanical attrition be used in forming the specified particle size of the water-insoluble β-1,4 glucan-containing material.

Hereinafter, the term "cellulose" will be used to represent β-1,4 glucan-containing materials for ease of explanation and illustration.

Chemical degradation of the cellulose material is brought about in a known manner to facilitate disintegration, for example, the material may be subjected to acid or alkali hydrolysis, or enzymatic treatment. One specific method of obtaining the desired result is reported in U.S. 2,978,446 issued Apr. 4, 1961, to A. O. Battista et al., wherein cellulose is subjected to a 2.5 normal aqueous solution of hydrochloric acid at boiling (about 105° C.) for 15 minutes. This more drastic hydrolysis treatment provides a material which may be readily mechanically attrited in an aqueous medium with a nominal amount of energy. Similar treatments with mineral acids or alkali under more or less drastic conditions will produce attritable degraded cellulose using nominal or increased energy for disintegration of the material to the proper particle size.

The type of starting material prior to chemical degradation will also determine the amount or input energy for attrition of the cellulose to obtain the desired particle size. For example, dilute hydrochloric acid hydrolysis of regenerated forms of cellulose will produce a material substantially all of which can be attrited to the desired particle size by merely dispersing the same with a conventional electrically driven kitchen beater in an aqueous medium for a few minutes. Other forms of cellulose, for example, wood pulp and cotton linters, after a similar hydrolysis treatment must be attrited with the same or more efficient equipment for at least one half hour or more in an aqueous medium to provide a material at least a portion of which is within the desired particle size range. Mechanical attrition may be carried out by known techniques using, for example, kitchen mixers, blenders, planetary mixers, ball mills, attrition mills, sonic mixers, high speed shearing devices, and the like. In addition, the material may be forced through a multiplicity of fine holes whereby it is subjected to a shearing action first by passage through said holes and thereafter by rubbing together of the various particles under the influence of applied force. The disintegration is preferably carried out in the presence of an aqueous medium to appreciably reduce the energy necessary to produce smaller particle sizes. The attrition should be extended to produce a mass wherein at least 1% of the particles are less than 1 micron; preferably 30%, and more preferably over 80% of the particles measure no greater than about 0.4 micron. Particles having a size, for example, as small as 0.01 micron are useful for this invention.

As previously stated, regenerated forms of cellulose, for example, regenerated cellulose film, are easily brought to the prescribed particle size after the controlled acid hydrolysis by merely dispersing the wet-cake material in water with a mixer. This will produce a stable disperson wherein the dispersed particles are substantially all less than the prescribed 0.4 micron size. When wood pulp, cotton linters, and similar cellulose materials of greater molecular weight are hydrolyzed under controlled conditions and mechanically attrited in an aqueous medium, many larger particles are present along with the desired small particles. When these cellulosic materials are dried after attrition they are difficult to redisperse in water. It has been found that this type of material may be advantageously combined with a minor proportion of a specific barrier material to provide a readily redispersible mass.

Briefly, the barrier material is a specified sodium salt of carboxymethyl cellulose having a degree of substitution of from about 0.60 to about 0.85, and preferably having a viscosity in centipoises at 25° C. in a 2% aqueous solution of less than 18 up to about 800. The barrier may be combined with the finely divided cellulose by drying a suspension of the cellulose particles in the presence of a minor proportion of the barrier material. The combination of barrier and cellulose particles is effective for the purpose of this invention.

Similarly, for the purpose of the invention, water-insoluble derivatives of β-1,4 glucan may be substituted for β-1,4 glucan. These derivatives include, for example, oxidation derivatives containing one or more chemical groups including aldehyde, carboxyl and mixed aldehyde-carboxyl derivatives; ether derivatives characterized by having one or more —OR groups where R may be an aliphatic or substituted aliphatic radical, either a straight or branched chain containing from one to twelve or more carbon atoms, an aryl or aralkyl or substituted aralkyl radical or a carboxyalkyl, hydroxyalkyl, cyanoalkyl, alkoxyalkyl, aralkoxyalkyl, or dialkylaminoalkyl radical; and ester derivates, for example, esters of inorganic acids such as nitrates, sulfates, phosphates, and esters of organic acids such as formates, acetates, propionate, butyrates, thiocyanates, mixed acetate-propionates, mixed acetate-butyrates, other aliphaticcarboxylic acid derivatives containing up to 18 or more carbon atoms, and aryl or aralkyl esters such as, for example, benzoates, phenylacetates, phthalates, naphthenates, and the like.

These derivatives may be prepared before the chemical and mechanical attrition treatment by derivatizing the β-1,4-glucan-containing material to obtain a water-insoluble product, or the finely-divided β-1,4 glucan material having the required particle size may be derivatized to obtain essentially water-insoluble topochemical derivatives. In any event, the finely-divided β-1,4-glucan or its derivatives must be water-insoluble and have at least about 1% by weight of the particles below 1 micron with a ratio of length to diameter greater than 1.

The normally solid wax material of this invention includes wax or wax-like material melting between about 50° C. and about 150° C. including, for example, natural waxes of mineral, vegetable, and animal origin, and synthetic waxes. Examples of these materials are beeswax, candelilla wax, carnauba wax, ceresine wax, Chinese insect wax, esparto wax, Japan wax, montan wax, ouricury wax, ozokerite wax, palm wax, spermaceti wax, sugarcane wax; hydrocarbon waxes including amorphous and microcrystalline hydrocarbon waxes, for example, paraffin wax, chlorinated paraffin wax, microcrystalline paraffin wax, hydrogenated and oxidized microcrystalline wax; fatty amide waxes including, for example, octadecenamide, cetylacetamide, condensates of higher fatty amides with formaldehyde; methylene bis-amide, higher melting methoxy-polyethylene glycol, hydrogenated castor oils, deresinized montan wax, coal-tar wax, long-chain fatty alcohols, glyceryl tristearate, and the like, and mixtures of these and other waxes.

While the method of this invention is advantageous for the preparation of wax dispersions in the absence of surface active agents and/or emulsifiers, it may be desirable under certain conditions to add small amounts of those materials during the preparation of the dispersion. Other materials useful for this invention would include, for example, agents such as triethanolamine, sorbitan monooleate, polyoxyethylene derivatives of esters of fatty acids and alcohols, and borax.

In addition to the essential components of the wax dispersion, one may also include other materials which do not appreciably effect its stability including, for example, colorants, dyes, coalescents, antifreeze compounds, fillers, plasticizers, preservatives, defoamers, pH adjustors, etc.

The following examples are set forth to demonstrate the methods of this invention.

Example I

Aqueous dispersions of finely-divided cellulose, having at least 80% of its particles under 0.05 micron, Stokes equivalent diameter, and said particles having an average ratio of length to diameter of about 2:1, were prepared by subjecting regenerated cellulose film fragments to a boiling 2.5 normal solution of hydrochloric acid for about 15 minutes, separating the residue by filtration and washing with water until neutral. The resulting wet cake was mixed with water heated to about 100° C. in a Waring Blendor to produce several dispersions of varying solids content.

Paraffin wax (M.P. 55° C.) was heated to from about 20–30° C. above its melting point and slowly added with agitation in a Waring Blendor to the aqueous dispersions of finely-divided cellulose. The agitation speed was reduced and the mixture allowed to cool to less than 50° C. whereupon solid spheres of paraffin wax were formed. Microscopic examination showed all wax spheres to be less than 20 microns, and the bulk thereof less than 5 microns.

Several aqueous wax dispersions were prepared in the above manner containing 9.1% wax with 0.9% finely-divided cellulose, 35 and 40% wax with 1.3% finely-divided cellulose, 50% wax with 1% finely-divided cellulose, and 57% wax with 0.9% finely-divided cellulose, respectively, the remainder of the dispersion being only water. Each dispersion dispersed readily in water showing that the systems were of the O/W emulsion type.

The above wax dispersions containing up to 40% wax were used to readily coat metal, paper, and glass surfaces, and were dried to a hard wax surface. On paper, the wax coatings were caused to melt and were blended into the paper web to form waxed paper.

Because of the fine particle size of the wax, the fluid nature and shear stability of the wax dispersions, they can be applied to surfaces by spray technique. The dispersions also have imparted to them, because of the nature of the small particle emulsifier, thixotropic properties, and cling to vertical or under surfaces.

The wax dispersions can be dried, for example, by freeze drying, and maintain their small size and spherical particle shape. The dry particles can be redispersed in water.

A typical commercial wax emulsion comprises.

| Material: | Percent |
|---|---|
| Wax | 15–20 |
| Triethanolamine | 4 |
| Red oil | 2 |
| Borax | 1 |
| Water | 75–80 |
| Bentonite | 5–6 |

The above emulsion is not stable to freezing. After freezing the commercial wax emulsion with Dry Ice to −60° C., the frozen material was allowed to thaw to 25° C. The ingredients settled out and could not be redispersed with agitation. With the same freezing and thawing procedure, using the 40% wax emulsion as described above, the material readily reformed a stable emulsion after hand shaking.

The typical commercial wax emulsion as described above is not stable under acid and alkaline conditions. To promote this, it is necessary to add natural hydrocolloids to the water phase of the formulation. Added ingredients of this nature further detract from the useful wax properties. The wax dispersions of this invention are stable to pH changes over a wide range. To demonstrate this, the 40% wax emulsion as described above, was adjusted to about a pH of 3 with acetic acid. After standing one hour, the emulsion remained stable. This same wax emulsion was brought to a pH of 11 with a 1.0 normal sodium hydroxide solution. The emulsion remained stable after standing for one hour. The alkaline emulsion was neutralized with acetic acid to a pH of 7 and allowed to stand. The emulsion did not break in the presence of the salt, sodium acetate, formed during these procedures.

Example II

A paraffin wax emulsion was prepared as described in Example I with an aqueous dispersion of finely-divided cellulose particles, 30% by weight of said particles having a particle size no greater than 0.4 micron, Stokes equivalent diameter, and a length to diameter ratio of from 2:1 to 15:1, and said cellulose particles being mixed with 8%, based on the weight of the cellulose of sodium carboxymethyl cellulose of medium viscosity and having a D.S. in the range of 0.60 to 0.85. The ultimate mixture contained 20% wax, 78% water and 2% finely-divided cellulose. The preparation was thick but pourable and comprised discrete wax spheres in dispersion which demonstrated Brownian movement.

Example III

An inversion method of preparing an oil-in-water type wax emulsion was demonstrated by melting paraffin wax, as described in Example I, and stirring the melt in an Eppenbach homomixer. A finely-divided cellulose dispersion in water, similar to those of Example I, was brought to boiling and slowly added to the molten paraffin wax with agitation. The material gradually thickened to the inversion point where the emulsion type changed rapidly from water-in-oil to oil-in-water, and the mixture became fluid. The emulsion was allowed to cool quiescently. The product was a stable wax emulsion of the oil-in-water type containing 26.5% wax, 72% water, 1.5% finely-divided cellulose by weight.

Example IV

An attempt was made to make a stable wax emulsion with other colloid-forming materials.

A "colloidal silica," commercially available as Ludox and sold as a 30% water dispersion wherein the particles are so fine that the dispersion in transparent, was diluted with water. The aqueous colloidal dispersion was brought to boiling and slowly added to molten paraffin wax, as described in Example III, to produce a mixture containing 28.8% wax, 66.7% water, and 4.5% colloidal silica. At first, a water-in-oil emulsion was formed which, at high water level, changed into an oil-in-water emulsion. The hot mixture was allowed to cool while standing. The wax separated from the water and two distinct phases were formed, thus demonstrating that "colloidal silica" does not act as an emulsifier under similar conditions as described for the finely-divided cellulose even at three times the additive level.

Attempts were also made to prepare a paraffin wax dispersion or emulsion with the aid of bentonite, a finely-divided clay. Bentonite was mixed with water in a Waring Blendor and the dispersion heated to about 100° C. Paraffin was was melted to about 20–30° C. over its melting point and the melt slowly added to the hot bentonite colloidal dispersion with agitation to produce a mixture containing 20% wax, 78% water, and 2% bentonite by weight. When the addition was complete, agitation was reduced and the mixture allowed to cool to less than 50° C. The paraffin in the mixture coalesced to a large ball of wax, and only a small amount, less than 20% of the wax portion of the mixture, remained dispersed in the bentonite system.

Example V

A high wax content dispersion was prepared by mixing molten paraffin wax (M.P. 55° C.) into an aqueous dispersion of finely-divided cellulose as described in Example I. The ultimate mixture contained 55% wax, 44.1% water, and 0.9% finely-divided cellulose. On completion of the wax addition, the mixture was allowed to cool without agitation to a temperature less than 55° C. The sample was very thick, but pourable, and comprised discreet wax spheres dispersed in water, demonstrating Brownian movement. The dispersion was spread on a glass slide and the water evaporated. The wax remained as discreet particles. The dried wax particles could be redispersed in water by shaking.

Example VI

A 22% carnauba wax emulsion was prepared in a manner similar to that shown in Example I. The wax emulsion was spread on a pair of leather shoes and on a stone table top. The liquid material was allowed to dry and the surface rubbed with a paper towel, then buffed with a soft cloth to a high shine. Carnauba wax is very durable and is used as a component of shoe polish, floor wax, and automobile polish finishes.

The substitution of derivatives of β-1,4 glucan material, as previously described, for the β-1,4 glucan material (cellulose) of the foregoing examples, will produce good results. Likewise, finely-divided β-1,4 glucan material combined with a minor proportion of a sodium salt of carboxymethyl cellulose, as previously described, may be substituted for the material of the foregoing examples with good results as shown specifically in Example II.

Dilution of the wax emulsions with other liquids such as alcohols, will speed up the evaporation rate of the liquid phase. This is helpful in the spray application of the wax emulsion in many instances.

Various changes and modifications may be made practicing the invention without departing from the spirit and scope thereof and, therefore, the invention is not to be limited except as defined in the appended claims.

I claim:
1. A method of preparing an aqueous wax dispersion of the oil-in-water type which comprises mixing together (1) an aqueous dispersion of finely-divided, water-insoluble, organic particles, a major proportion consisting of β-1,4 glucan, at least about 1% by weight of said particles having a size of no greater than about 1 micron and having a length to diameter ratio greater than 1 and (2) a normally solid wax material in a fluid state, and solidifying said wax material, said wax dispersion containing from about 0.5 to 5 weight percent of said water-insoluble organic particles and from about 10 to about 60 weight percent of said wax material.

2. The method of claim 1 wherein the water-insoluble organic particles consist of a major proportion of β-1,4 glucan, at least about 30% of said particles having a size no greater than about 0.4 micron and a length to diameter ratio of from 2:1 to 15:1, and substantially all of said particles being no greater than 11 microns.

3. The method of claim 1 wherein the water-insoluble, organic particles consist of a major proportion of β-1,4 glucan, at least about 80% of said particles having a size no greater than about 0.4 micron and a length to diameter ratio of from 2:1 to 15:1.

4. The method of claim 1 wherein the water-insoluble organic particles are combined with a minor proportion of a sodium salt of carboxymethyl cellulose having a degree of substitution of 0.60 to 0.85.

5. The method of claim 1 wherein the wax material in a fluid state is dissolved in an organic solvent which is capable of removal from the aqueous system by heating to no greater than about 100° C.

6. The method of claim 1 wherein the wax material in a fluid state is in a molten condition and the aqueous dispersion is at a temperature of from about 80 to 100° C.

7. The method of claim 6 wherein the molten wax is added to the aqueous dispersion.

8. The method of claim 6 wherein the aqueous dispersion is slowly added to the molten wax until an oil-in-water type emulsion is attained.

9. A stable, oil-in-water type, wax dispersion consisting essentially of from about 10 to 60% spherical wax particles, a major proportion of which are less than 20 microns and from about 0.5 to about 5% based on the weight of the dispersion of finely-divided, water-insoluble, organic particles, a major proportion consisting of β-1,4 glucan, at least about 1% by weight of said particles having a size no greater than about 1 micron and having a length to diameter ratio greater than 1, and water.

10. The wax dispersion of claim 9 wherein the water-insoluble, organic particles consist of a major proportion of β-1,4 glucan, at least about 30% of said particles having a size no greater than about 0.4 micron and a length to diameter ratio of from 2:1 to 15:1, substantially all of said particles being no greater than 11 microns.

References Cited

UNITED STATES PATENTS

| | | | |
|---|---|---|---|
| 2,369,992 | 2/1945 | Treacy | 106—271 |
| 2,550,211 | 4/1951 | Watters et al. | 106—170 |
| 2,567,722 | 9/1951 | Marberg et al. | 106—191 |
| 2,626,870 | 1/1953 | Cooke et al. | 106—271 |
| 2,658,004 | 11/1953 | Eldridge et al. | 106—271 |
| 2,754,206 | 7/1956 | Olson | 106—271 |
| 2,978,446 | 4/1961 | Battista et al. | 260—212 |

MORRIS LIEBMAN, *Primary Examiner.*

H. S. KAPLAN, *Assistant Examiner.*

U.S. Cl. X.R.

106—201, 191, 170